Sept 17, 1957  R. J. BLACKMAN  2,806,321
ELECTRIC INSECT TRAP
Filed May 4, 1956
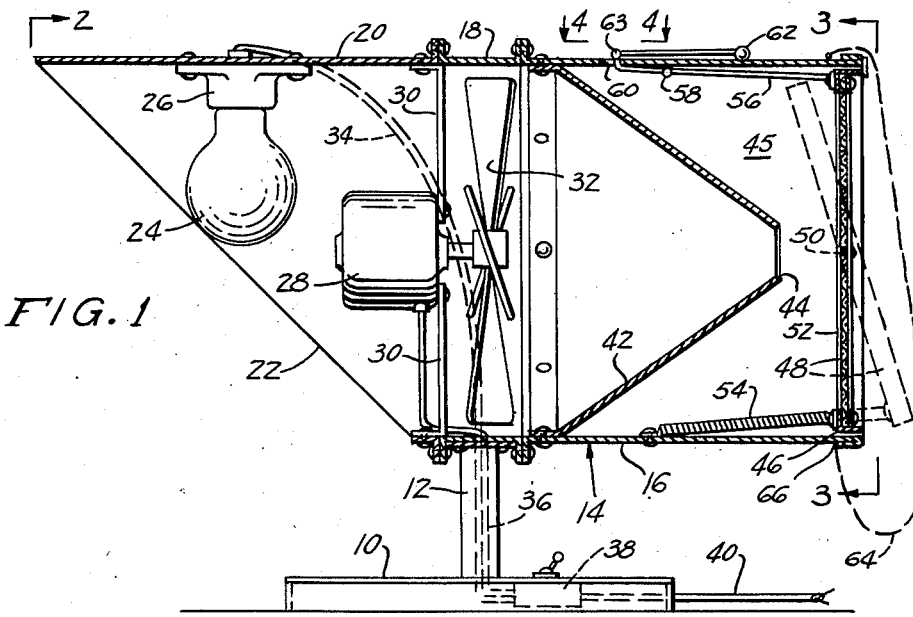
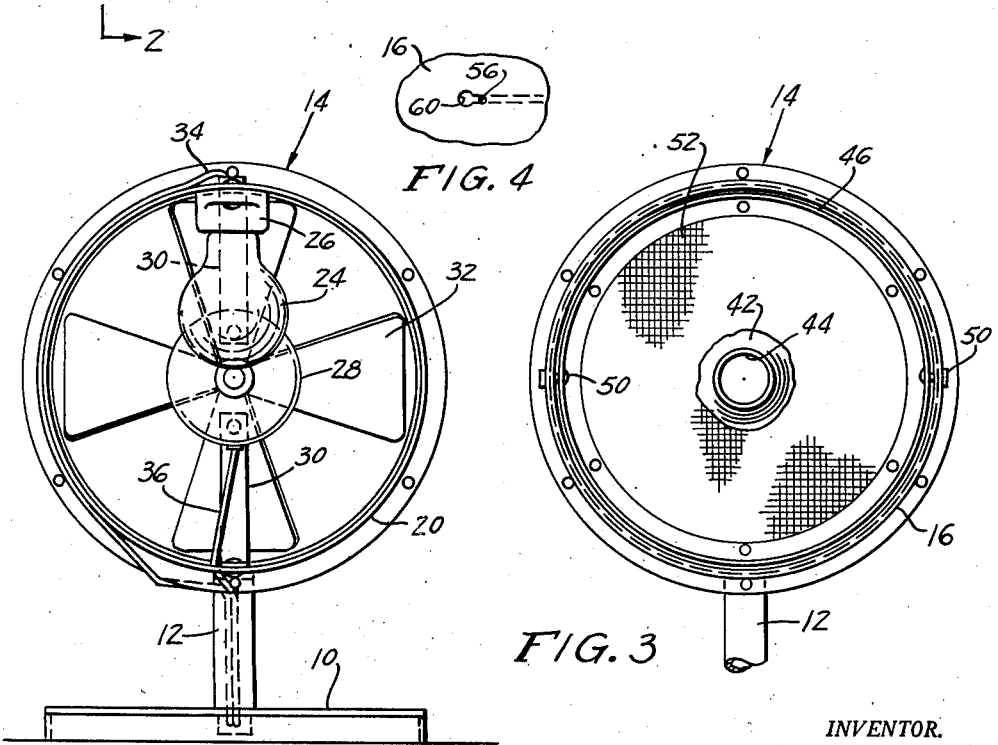
INVENTOR.
REED J. BLACKMAN
BY
McMorrow, Berman & Davidson
ATTORNEYS United States Patent Office 2,806,321
Patented Sept. 17, 1957

2,806,321

ELECTRIC INSECT TRAP

Reed J. Blackman, Stover, Mo.

Application May 4, 1956, Serial No. 582,871

3 Claims. (Cl. 43—139)

The present invention relates to devices for trapping insects, and more particularly refers to a trap including electrically actuated components designed for enticing the insects to the area of the trap, and for entraining the insects in an air current, to cause the insects to enter an enclosure in which they will be confined.

Summarized briefly, the invention is a device specifically designed to trap insects of the types attracted by light. To this end, the invention includes a lamp bulb, disposed in a hood, and adjacent the lamp bulb, an electric fan is mounted, so designed as to create a strong air current that will cause insects attracted to the bulb to be blown through a conical entranceway to a confining enclosure. The enclosure is provided, at the end thereof remote from the entranceway, with a pivoted door of screen mesh material, the material of the door being designed to permit the air to pass directly through the enclosure while preventing the passage of insects. The door is spring biased to a closed position, but can be readily opened and releasably latched in an open position, for removal of the insects.

Important objects of the invention are, among others, as follows:

To provide a trap as stated that will be particularly efficient in respect to the trapping of any insects approaching the vicinity of the lamp bulb;

To so design the trap as to cause the same to effectively trap a large number of insects in a relatively short period of time;

To facilitate the removal of the insects whenever desired;

To so design the trap as to permit its association with previously installed lamp bulbs and/or fans;

To permit manufacture of the trap at a relatively low cost; and

To facilitate the positioning of the trap at any location desired, with minimum difficulty, so that the trap can be readily transferred from place to place.

Other objects will appear from the following description, the claims appended thereto, and from the annexed drawing, in which like reference characters designate like parts throughout the several views, and wherein:

Figure 1 is a view partly in longitudinal section and partly in side elevation of a trap formed according to the present invention, the door being shown in full and dotted lines in closed and open positions respectively;

Figure 2 is an end elevational view of the trap, as seen from the line 2—2 of Figure 1;

Figure 3 is an end elevational view as seen from the line 3—3 of Figure 1; and

Figure 4 is an enlarged, fragmentary top plan view showing the door latching means, as seen from the line 4—4 of Figure 1.

Referring to the drawings in detail, a base 10 is of flat formation, and may readily be formed from pressed steel or equivalent material, said base including a top plate integral with a depending peripheral flange. Secured to and projecting upwardly from the base is a standard 12 formed of tubular material, cooperating with the base in forming a support and mounted upon the standard is a relatively large casing generally designated 14, comprising a main casing section 16 of circular cross section, formed open at its opposite ends, an intermediate casing section 18 of a diameter equal to that of the section 16, and an inlet section 20. The inlet section 20 is provided at one end with an outwardly directed flange, the adjacent end of section 16 being correspondingly flanged. The intermediate section 18 is flanged for connection to the flanges of the sections 16, 20 respectively.

The section 20 provides a hood, and is cut away diagonally as at 22, so as to define thereon side walls merging into a top wall.

An electric lamp bulb 24 is threadable into a socket 26 connected to and depending from a top wall intermediate opposite ends of section 20.

An electric fan is provided adjacent the bulb 24, and includes a motor 28 centered in casing 14, said motor being supported in its centered position by aligned arms 30, 30 (Figures 1 and 2) connected between the motor and diametrically opposite portions of section 20. The fan includes a fan blade assembly 32, so pitched that on operation of the motor, a current of air will be set up, passing the bulb 24 within the hood, from left to right in Figure 1.

To provide electrical current for the bulb and motor, a cord 34 extends to the terminals of the lamp bulb socket 26, and a cord 36 extends from the fan motor, said cords extending to a switch 38, from which extends a conductor 40 which would be provided with an electrical plug, not shown, adapted to be plugged into a conventional receptacle.

At the inlet or left hand end of the main casing section 16, there is mounted a frustro-conical inlet member 42, the smaller end 44 of which opens into a compartment 45 in which the insects would be trapped.

At the opposite or outlet end of compartment 45, the compartment is normally closed by a door engaging, when in its closed position, an angular flange 46 mounted at the lower portion of the section 16. The door has been designated at 48, and is formed of a screen mesh material. Said material would of course be enclosed in a suitable frame, and it will be understood that if desired, the mesh can comprise, in actuality, a plurality of screen members each of a different mesh.

The door is of circular outer configuration, and is of a diameter slightly less than that of section 16, so that the door will fit snugly in its closed position, to prevent the escape of insects. At diametrically opposite locations, the door is pivoted upon the section 16 by pivot pins 50 (Figure 3), said pins being aligned on a horizontal axis so that the door will be swingable about said axis between the positions shown in Figure 1 in full and dotted lines.

The body portion of the door has been designated at 52, this being comprised of the screen mesh material previously referred to.

Normally holding the door in closed position is a contractile spring 54 one end of which is connected to the bottom portion of casing section 16 intermediate opposite ends of said section, with the other end being connected to the lower portion of the door. The spring, tending to contract, causes the door to abut against the stop flange, provided in the casing section 16, so that the door in this position will be disposed in a plane normal to the axis of the section 16.

Connected to the door, at a location diametrically opposite the connection of the spring 54 thereto, is a pull cord 56, provided intermediate its ends with a knot 58 or other enlargement. Cord 56 extends through a keyhole slot 60 formed in the top wall of the casing section 16, and at its free end, the cord has a ball element 62 facilitating grasping of the cord for the purpose of pulling the same. Between knot 58 and ball element 62 there is provided a second enlargement 63, which engages the wall of the keyhole slot 60 in the closed door position.

When the door is to be opened, one disengages the cord from the smaller end of the keyhole slot, and exerts a pull thereupon, tending to swing the door to open position against the restraint of spring 54.

The enlargement 58 will now move through the larger end of slot 60, and will now be shifted into the smaller end of the slot for the purpose of releasably latching the door in open position.

Before the door is swung to its open position, an airpervious bag 64 of mosquito netting or similar material is engaged about the outlet end of the casing, being secured to the casing by a draw string or by an annular spring element 66.

With the fan on, and the door open, the insects will be blown into the bag 64 so that they can thereafter be readily disposed of after the trap has been cleaned out.

In use of the device, the switch 38, when thrown to its "on" position, energizes the bulb 24 and motor 28. As a result, insects attracted to the vicinity of the bulb will be blown, by the air current generated by the fan, into the compartment 45 through the inlet member 42. The insects will not be able to leave the compartment through the inlet member, as long as the fan is energized, due to their inability to fly against the strong current of air. Subsequently, they may be readily removed in the manner previously described, after which the fan can be turned off.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. An insect trap comprising a support; a casing on the support in the form of an open-ended, horizontally extending cylinder having one end cut away in a plane oblique to the length of the cylinder to form a beveled inlet hood at said end of the cylinder open both along one side and one end; illuminating means mounted in the hood in a position to cast its beams through the open side and end of the hood; fan means mounted within and intermediate the ends of the cylinder for rotation in a direction to draw air through the open side and end of the hood and direct the air in a current passing axially of the cylinder and out the other end thereof; a funnel-like member in the cylinder tapering toward said other end of the cylinder and located between the fan means and said other end of the cylinder; and a foraminous door on said other end of the cylinder spaced from said member to form therebetween a compartment in which insects will be trapped.

2. An insect trap comprising a support; a casing on the support in the form of an open-ended, horizontally extending cylinder one end of which provides an inlet and the other end an outlet; illuminating means mounted in the inlet end of the cylinder to attract insects to said inlet end; a fan means mounted intermediate opposite ends of the cylinder and mounted for rotation in a direction to draw air through the inlet end, pass the same axially of the cylinder, and move the air out the other end; a funnel-like member mounted in the cylinder intermediate the fan means and said other end thereof and tapering in the direction of said other end of the cylinder; a foraminous door mounted in said other end of the cylinder for pivotal movement about an axis extending diametrically of the cylinder, whereby on swinging of the door to an open position said door will have one portion thereof disposed outwardly from the cylinder and a diametrically opposite portion disposed inwardly from said other end of the cylinder; a contractile spring connected between the wall of the cylinder and the first-named portion of the door, tensioned to normally pull said first named door portion into said other end of the cylinder to maintain the door in a closed position; a cord connected to the second-named portion of the door and extending longitudinally of and within the cylinder, the cylinder having an aperture through which said cord extends; and an abutment on the cord so disposed that on pulling of the cord in a direction to swing the door to open position against the restraint of the spring, said abutment will engage an edge of the opening to maintain the door in open position.

3. An insect trap comprising a support; a casing on the support in the form of an open-ended, horizontally extending cylinder one end of which provides an inlet and the other end an outlet; illuminating means mounted in the inlet end of the cylinder to attract insects to said inlet end; a fan means mounted intermediate opposite ends of the cylinder and mounted for rotation in a direction to draw air through the inlet end, pass the same axially of the cylinder, and move the air out the other end; a funnel-like member mounted in the cylinder intermediate the fan means and said other end thereof and tapering in the direction of said other end of the cylinder; a foraminous door mounted in said other end of the cylinder for pivotal movement about an axis extending diametrically of the cylinder, whereby on swinging of the door to an open position said door will have one portion thereof disposed outwardly from the cylinder and a diametrically opposite portion disposed inwardly from said other end of the cylinder; a contractile spring connected between the wall of the cylinder and the first-named portion of the door, tensioned to normally pull said first named door portion into said other end of the cylinder to maintain the door in a closed position; a cord connected to the second-named portion of the door and extending longitudinally of and within the cylinder, the cylinder having an aperture through which said cord extends; an abutment on the cord so disposed that on pulling of the cord in a direction to swing the door to open position against the restraint of the spring, said abutment will engage an edge of the opening to maintain the door in open position; and a second abutment on the cord spaced from the first named abutment, said second named abutment engaging said edge of the aperture in the closed position of the door to limit swinging movement of the door about its pivot axis beyond the closed position thereof.

References Cited in the file of this patent

UNITED STATES PATENTS

| 670,449 | Hyman | Mar. 26, 1901 |
| 738,184 | Goodwin | Sept. 8, 1903 |
| 1,671,404 | Cherry | May 29, 1928 |
| 2,778,150 | Pohlman | Jan. 22, 1957 |